(12) United States Patent
Smith

(10) Patent No.: US 7,748,953 B2
(45) Date of Patent: Jul. 6, 2010

(54) APPARATUS AND SYSTEM HAVING AN OVER TEMPERATURE FUSE IN A SIGNAL TUBE FOR A GAS TURBINE ENGINE

(75) Inventor: Daniel Drew Smith, Mason, OH (US)

(73) Assignee: General Electric Company, Schenectady, NY (US)

( * ) Notice: Subject to any disclaimer, the term of this patent is extended or adjusted under 35 U.S.C. 154(b) by 780 days.

(21) Appl. No.: 11/646,026

(22) Filed: Dec. 27, 2006

(65) Prior Publication Data

US 2008/0159846 A1 Jul. 3, 2008

(51) Int. Cl.
 *F04D 25/00* (2006.01)
(52) U.S. Cl. ..................................................... 415/118
(58) Field of Classification Search ...................... 415/9, 415/118, 177; 73/700; 236/61, 34.5
 See application file for complete search history.

(56) References Cited

U.S. PATENT DOCUMENTS

| | | | | |
|---|---|---|---|---|
| 2,929,558 A * | 3/1960 | Drapeau | ....................... | 236/34 |
| 4,114,808 A * | 9/1978 | Saylor | ......................... | 236/87 |
| 4,194,357 A * | 3/1980 | Matulich et al. | .............. | 60/772 |
| 6,708,568 B2 * | 3/2004 | Gleeson et al. | ............... | 73/756 |

2006/0241886 A1 10/2006 Ponziani

* cited by examiner

*Primary Examiner*—Ninh H Nguyen
(74) *Attorney, Agent, or Firm*—Marcella R Louke; William Scott Andes; General Electric Company

(57) ABSTRACT

Apparatus comprising a signal tube extending from an engine component on a hot side of a firewall in a gas turbine engine to an engine control mechanism disposed on a cool side of the firewall. The apparatus includes a fuse in the portion of the signal tube extending through the hot side. An exemplary fuse includes a temperature-sensitive inner member that is deformable upon exposure to temperatures greater than a predetermined temperature. The fuse is operative responsive to a breach in the signal tube to change from a first condition to a second condition to prevent an over-temperature situation on the cool side of the firewall. An outer member substantially enclosing the inner member provides information about the condition of the fuse. A system utilizing the fuse includes a gas turbine engine having a firewall separating a hot side from a cool side, an engine control mechanism disposed on the cool side, and a signal tube extending from a component on the hot side to the engine control mechanism. The engine control mechanism operates the engine with a first operating logic utilizing a pressure signal related to a static pressure of a fluid in the signal tube. Loss of the pressure signal causes the engine control mechanism to change to a second operating logic which does not utilize the pressure signal.

9 Claims, 4 Drawing Sheets

FIG. 4 "HOT"

APPARATUS AND SYSTEM HAVING AN OVER TEMPERATURE FUSE IN A SIGNAL TUBE FOR A GAS TURBINE ENGINE

BACKGROUND OF THE INVENTION

This invention relates generally to systems and apparatuses for preventing over temperature conditions in a non-fire zone of an aircraft engine, and more specifically to an over temperature fuse in a signal tube.

In the art, the full authority digital electronics control (FADEC) for a gas turbine engine utilizes a pressure signal from the combustor for control of the engine. Because a broken signal tube could allow hot air to enter the fan compartment, a non-fire zone, the FADEC shuts down the engine in a broken signal tube condition. The broken signal tube could be due to, for example, improper maintenance, tube fatigue, or foreign object damage from the aircraft to the engine.

For weight considerations, the signal tube is usually not insulated in the non-fire zone. Additionally, many engine programs use composites in the fan and nacelle compartments where leaking high temperature air can do damage. Temperature sensors and shut-off valves could be used to minimize the risk of leakage, but reliability, cost, and weight are negative factors.

Accordingly, it would be desirable to have a low cost, low weight, detection system that seals off flow of high temperature air in the non-fire zone.

BRIEF DESCRIPTION OF THE INVENTION

The above-mentioned need or needs may be met by exemplary embodiments that provide an alternative to engine shut down when a failure occurs in the signal tube and also prevents over-temperature conditions in the non-fire zone.

In an exemplary embodiment, there is provided an apparatus comprising a signal tube extending generally from an engine structure disposed on a hot side of a firewall in a gas turbine engine to at least one engine control mechanism disposed on a cool side of the firewall. A first portion of the signal tube extends on the hot side and a second portion of the signal tube extends on the cool side. The exemplary apparatus includes a fuse in the first portion of the signal tube.

In an exemplary embodiment, there is provided an apparatus including a fuse for a signal tube adapted to extend generally from an engine structure to an engine control mechanism. The fuse includes a pathway extending therein, and at least one inner member disposed adjacent the pathway. The inner member comprises a temperature-sensitive material operative to deform upon exposure to temperatures greater than a predetermined temperature.

In an exemplary embodiment, there is provided a system including a gas turbine engine having a firewall separating a hot side from a cool side. The gas turbine engine includes an engine structure disposed on the hot side of the firewall. The system also includes an engine control mechanism disposed on the cool side of the firewall. A signal tube extends between the engine structure and the engine control mechanism, wherein the signal tube includes a first portion disposed on the hot side and a second portion disposed on the cool side. The signal tube includes a fuse in the first portion.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
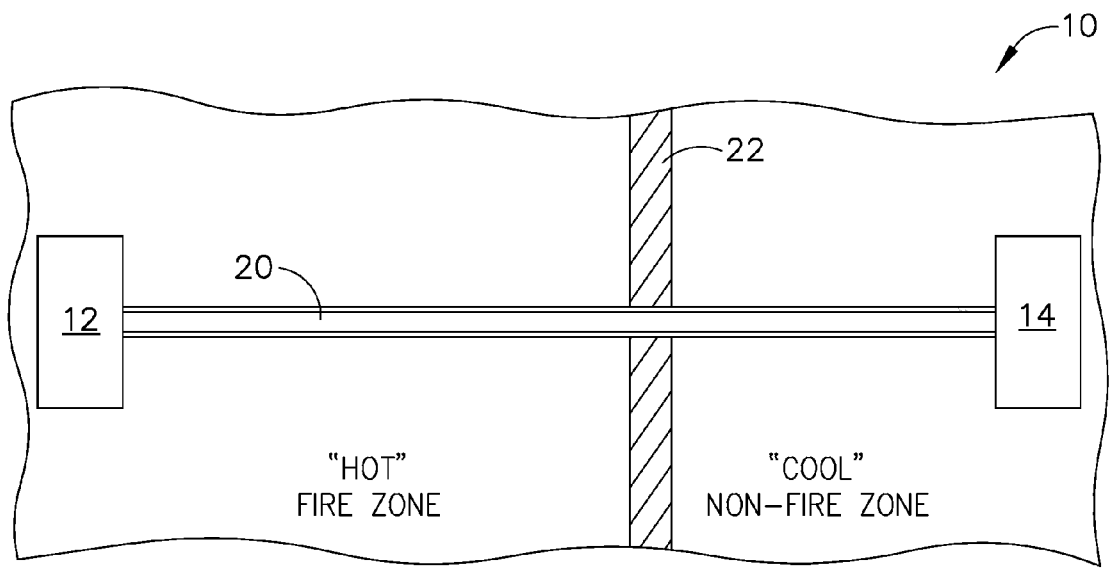
FIG. 1 is a schematic representation of a prior art system for delivering a pressure signal from a combustor to a full authority digital electronic control (FADEC).

Referring to the drawings wherein identical reference numerals denote the same elements, FIG. 1 illustrates the general current state of the art. In general terms, an apparatus 10, such as a gas turbine engine for an aircraft, includes an engine component 12, such as a combustor. An engine control mechanism 14, such as a full authority digital electronics control (FADEC), receives information from the engine component 12. A signal tube 20 generally extends from the component 12 to the control mechanism 14. The signal tube may be operative, for example, to provide information concerning the pressure in the combustor. In an exemplary embodiment, the signal tube contains generally static fluid, i.e., air. The pressure from the signal tube is input to the engine control or FADEC. Under current operating protocol, a loss of pressure signal to the engine control mechanism initiates an engine shutdown operation.

As is known in the art, an aircraft engine may employ one or more firewalls 22 to separate a fire-zone ("hot side") from a non-fire zone ("cool side"). Aviation regulations and other requirements mandate that hot air or other gases should not enter the non-fire zone. For example, some components on the cool side are formed of composite materials that are not rated for high temperature exposure. Also, due to weight considerations, some components disposed on the cool side do not have insulation or other fire protection. In some engine designs, the control mechanism or FADEC is disposed in a non-fire zone. In such designs, the signal tube 20 extends from the combustor on the hot side, to the control mechanism on the cool side.

Under normal operating conditions, the static fluid in the signal tube 20 is generally at ambient temperature. If a break or other breach (improper connections, etc) were to occur in the signal tube 20, the usually static fluid contained therein would leak to the surroundings and hot fluid (air) from the combustor would begin flowing in the tube and leaking through the breach. If the break or other breach occurs in the non-fire zone, the leaking fluid would exceed allowable temperature requirements.

In current operating protocols, if the engine control 14 or FADEC does not receive a pressure signal, due to a break or other breach, the engine is ordered to shut down in order to prevent over-temperature conditions on the cool side. If the break or other breach is due to a problem with the second engine, for example foreign object debris, the automatic shutdown of the remaining engine could create a hazardous condition. Although current safeguards use reinforcement in the nacelle to minimize the risk of a two engine aircraft experiencing engine shut down, an alternative solution is disclosed to add robustness and/or reduce nacelle weight.

Figure 2:
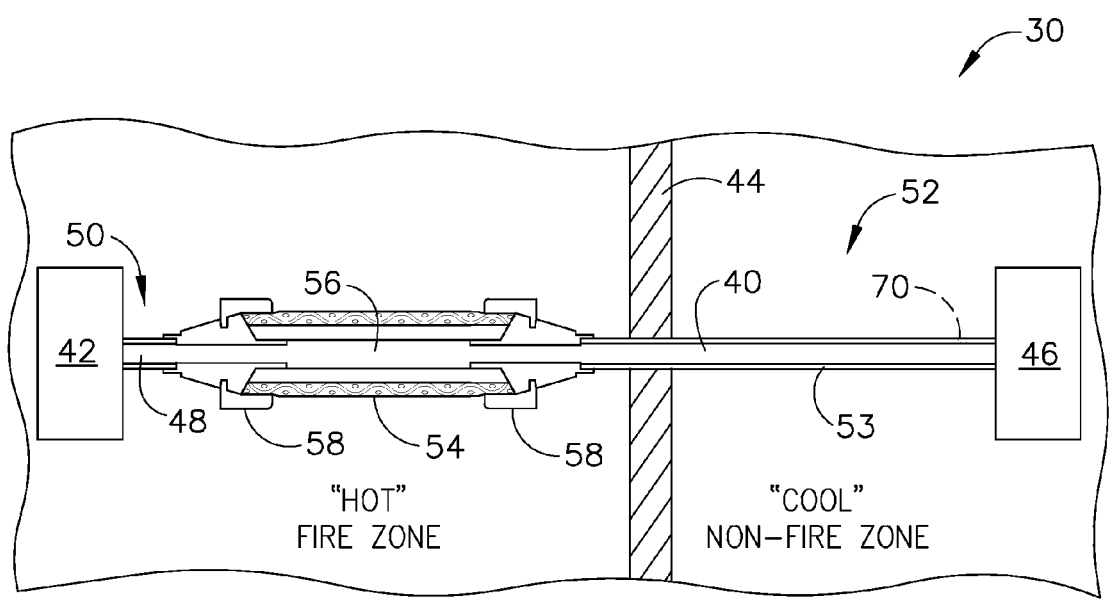
FIG. 2 is a schematic representation of a system including a fuse in the pressure signal tube.

With reference to FIG. 2, in an exemplary embodiment, engine 30 includes a signal tube 40 that extends between an engine component 42 on a hot side of a firewall 44 and an engine control mechanism 46 on a cool side of firewall 44. The exemplary signal tube 40 defines a flow path 48 therein. The signal tube 40 includes at least a first portion 50 extending on the hot side and a second portion 52 extending on the cool side.

Figure 3:
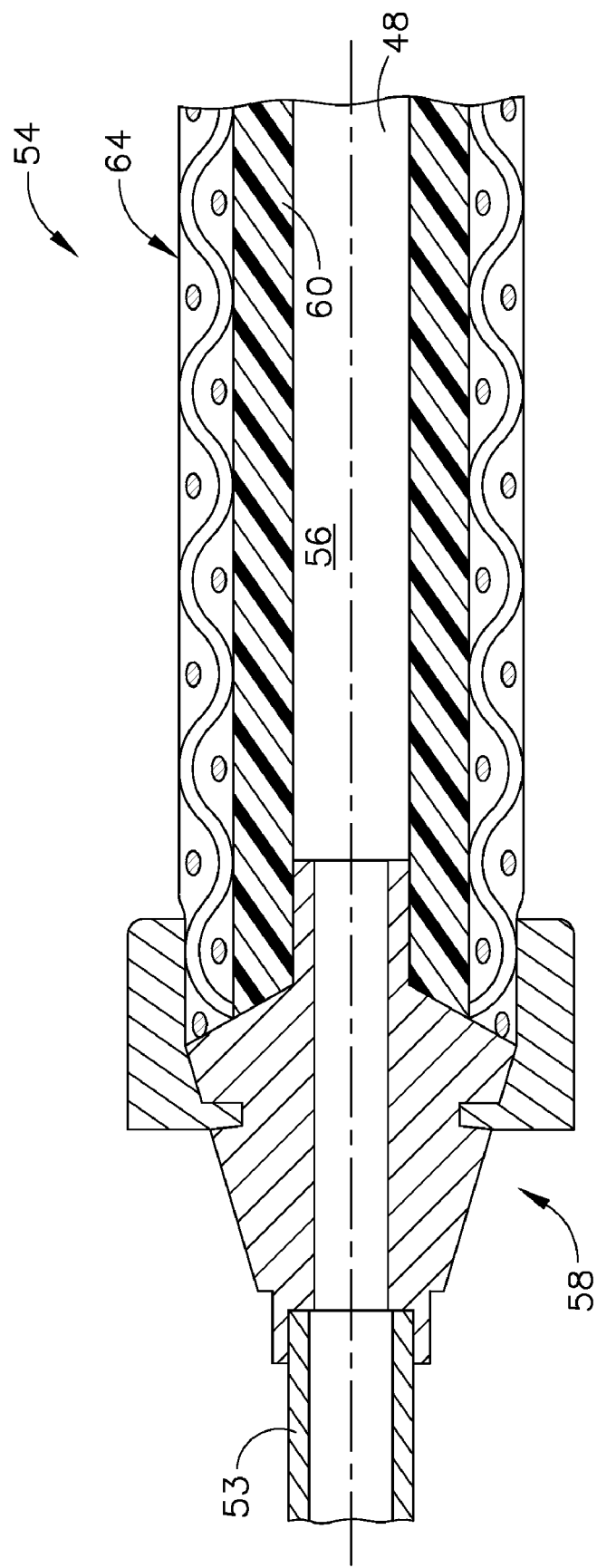
FIG. 3 is a partial cross-sectional view of a signal tube showing a fuse in a first condition having an unobstructed pathway therethrough.

With reference to FIGS. 2 and 3, in an exemplary embodiment, the signal tube 40 comprises shaped metal tubing 53 in operative connection with a substantially tubular fuse 54. Fuse 54 defines an inner pathway 56 forming a part of flow path 48. In an exemplary embodiment, fuse 54 includes fittings 58 at each end which are adapted to engage fuse 54 with the metal tubing 53. Many options are available for engaging the fuse with the metal tubing and the fittings 58 are merely exemplary.

An exemplary fuse 54 includes at least one inner member 60 disposed adjacent the flow path 48. In an exemplary embodiment, the inner member 60 comprises a hose formed of a temperature-sensitive material. In an exemplary embodiment, the temperature-sensitive material is deformable upon exposure to temperatures greater than a predetermined temperature. For example, an exemplary temperature-sensitive material comprises polytetrafloroethylene (PTFE) which melts upon exposures greater than 600° F. (326° C.). In other exemplary embodiments, the inner member 60 may comprise other temperature-sensitive materials such as brazing compounds. In an exemplary embodiment, the inner member 60 is operative to deform or melt at temperatures less than typical temperatures of air in a combustor. For example, the inner member 60 should melt or deform at temperatures less than about 1000° F. (538° C.). The melting or deforming temperature must be high enough that the inner member 60 remains intact during exposure to the ambient temperatures on the hot side.

In an exemplary embodiment, fuse 54 includes an outer member 64 substantially enclosing inner member 60. In an exemplary embodiment, the outer member 64 comprises a metal braid so as to provide reinforcement and flexibility for fuse 54. In an exemplary embodiment, the outer member 64 is operative to provide information about a condition of the fuse 54. For example, in an exemplary embodiment, an observer is able to perceive a condition of the fuse 54 upon visual perception of the outer member 64. Visual perception of the outer member 64 as shown in FIG. 3 shows that the fuse 54 is in a first condition having an operable pathway therethrough.

Figure 4:
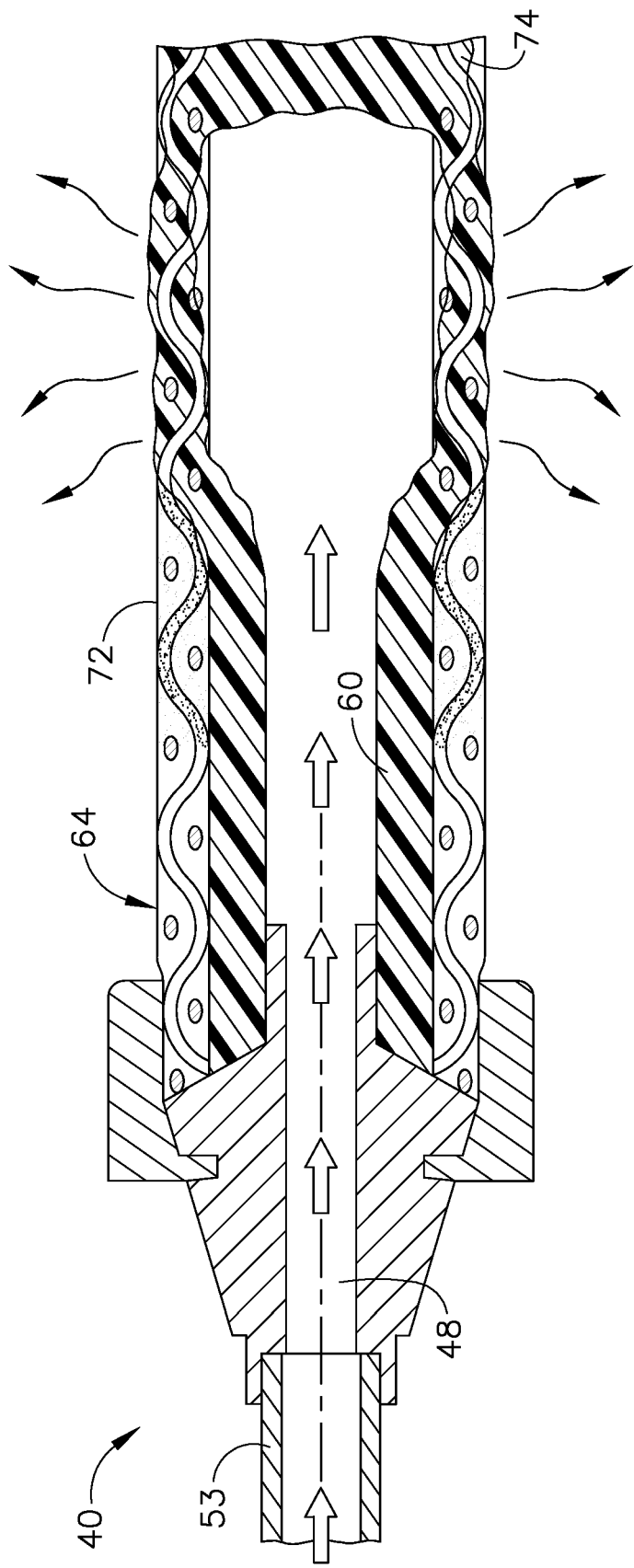
FIG. 4 is a partial cross-sectional view of a signal tube showing a fuse in a second condition wherein the pathway is obstructed.

As illustrated in FIG. 2, when operable, the signal tube 40 provides a pressure signal to at least one engine control mechanism 46 or FADEC. The signal tube 40 essentially contains static fluid (air) at ambient temperature along the length of flow path 48. Thus, the second portion 52, which extends on the cool side of the firewall 44, is able to meet the imposed temperature requirements. If a break or other breach 70, shown in phantom, occurs in the signal tube 40, hot fluid (air) at about 1000° F. (or greater) will flow through the signal tube 40 from the engine component 42, i.e., combustor, toward the breach. As shown in FIG. 4, if the breach is downstream of the fuse 54, eventually the inner member 60 will be exposed to temperatures greater than the predetermined temperature, i.e., about 600° F. (316° C.). Upon exposure to the elevated temperatures, the temperature-sensitive inner member 60 deforms (melts) and blocks fluid flow through flow path 48. In an exemplary embodiment, the hot fluid flows through the outer member 64 into the surrounding environment on the hot side of the firewall 44. The outer member 64 exhibits discoloration or scorching 72 due to the passage of the hot fluid therethrough. Thus, visual inspection of the outer member 64 provides information about the condition of the fuse 54. In a second condition, the pathway 56 is obstructed. Additionally, some melted material 74 may seep through the metal braid to provide visual information about the condition of the fuse 54. Because the hot fluid cannot flow to the second portion 52 of the signal tube, but is discharged on the hot side of the firewall, the second portion 52 (on the cool side) does not exceed temperature requirements.

If a breach 70 occurs in the signal tube 40 and the engine control mechanism does not receive the expected pressure signal, the engine control mechanism 46 is operable to use an alternative operating logic. The alternative operating logic allows engine operation without the pressure input from signal tube 40.

Figure 5:
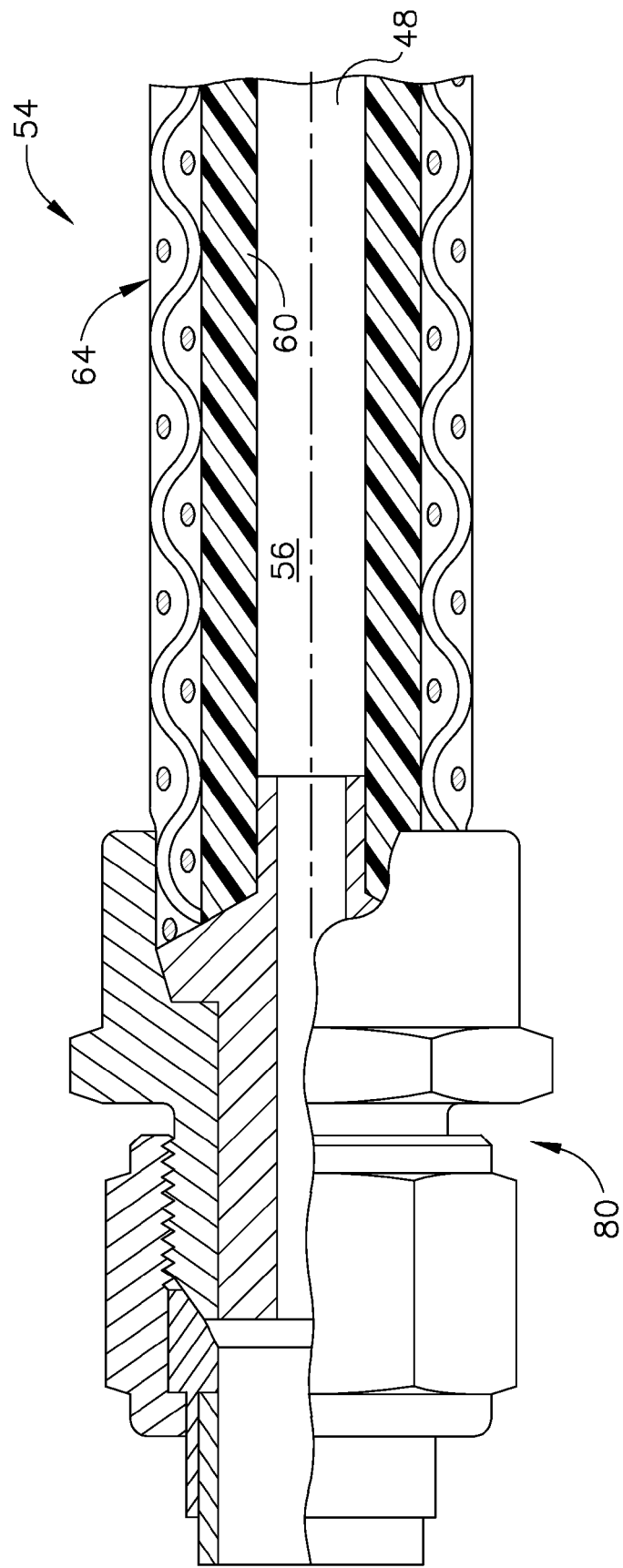
FIG. 5 illustrates an alternate fitting for a fuse.

FIG. 5 illustrates an alternate fitting 80 that may be employed in exemplary embodiments of fuse 54. Such a fitting 80 is merely exemplary and other alternative fittings may be used as will be appreciated by those with skill in the art.

Additionally, the alternate logic may be employed in other situations where the pressure signal is not received. For example, frozen moisture in the signal tube may prevent receipt of the pressure signal. Rather than engine shut down, the engine could be operated under the alternate operating logic. Such alternate logics are currently known and may be utilized within the scope of this disclosure.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. Apparatus comprising:
   a signal tube extending generally from an engine component disposed on a hot side of a firewall in a gas turbine engine to at least one engine control mechanism disposed on a cool side of the firewall, wherein a first portion of the signal tube is disposed on the hot side and a second portion of the signal tube is disposed on the cool side; and
   a fuse in the first portion of the signal tube, wherein the fuse includes at least one inner member extending in the signal tube, wherein the at least one inner member comprises a temperature-sensitive material, wherein the temperature-sensitive material is deformable upon exposure to temperatures greater than a predetermined temperature, and wherein the fuse includes a tubular outer member substantially enclosing the at least one inner member, wherein the outer member is operative to provide information about a condition of the fuse.

2. The apparatus according to claim 1, wherein the fuse is operative responsive to a breach in the signal tube to change from a first condition to a second condition.

3. The apparatus according to claim 2 wherein the signal tube includes a flow path at least partly defined by a pathway in the fuse, wherein when the fuse is in the first condition the pathway is substantially unobstructed, and wherein when the fuse is in the second condition, the pathway is substantially obstructed.

4. The apparatus according to claim 1 wherein the inner member comprises polytetrafloroethylene (PTFE).

5. The apparatus according to claim 1 wherein the predetermined temperature is greater than about 600° F. (316° C.).

6. Apparatus comprising:
a fuse for a signal tube adapted to extend generally from an engine component to an engine control mechanism, wherein the fuse includes a pathway extending therein, and at least one inner member disposed adjacent the pathway, wherein the inner member comprises a temperature-sensitive material operative to deform upon exposure to temperatures greater than a predetermined temperature, and wherein the fuse includes an outer member substantially enclosing the inner member, wherein the outer member is operative to provide information about a condition of the fuse.

7. A system including:
a gas turbine engine having a firewall separating a hot side from a cool side, the gas turbine engine including an engine component disposed on the hot side of the firewall;
a engine control mechanism disposed on the cool side of the firewall;
a signal tube extending between the engine component and the engine control mechanism, wherein the signal tube includes a first portion disposed on the hot side and a second portion disposed on the cool side; and
a fuse in the first portion of the signal tube
wherein the engine control mechanism is operative to control the gas turbine engine according to a first operating logic, wherein the first operating logic utilizes a pressure signal related to a static pressure of a fluid in the signal tube.

8. The system according to claim 7 wherein the engine control mechanism is operative to control the gas turbine engine according to a second operating logic, wherein the second operating logic does not utilize the pressure signal related to the static pressure of the fluid in the signal tube.

9. The system according to claim 8 wherein, when the engine control mechanism is controlling the gas turbine engine according to the first operating logic, a loss in static pressure of the fluid in the signal tube causes the engine control mechanism to change to the second operating logic.

* * * * *